United States Patent Office 2,708,126
Patented May 10, 1955

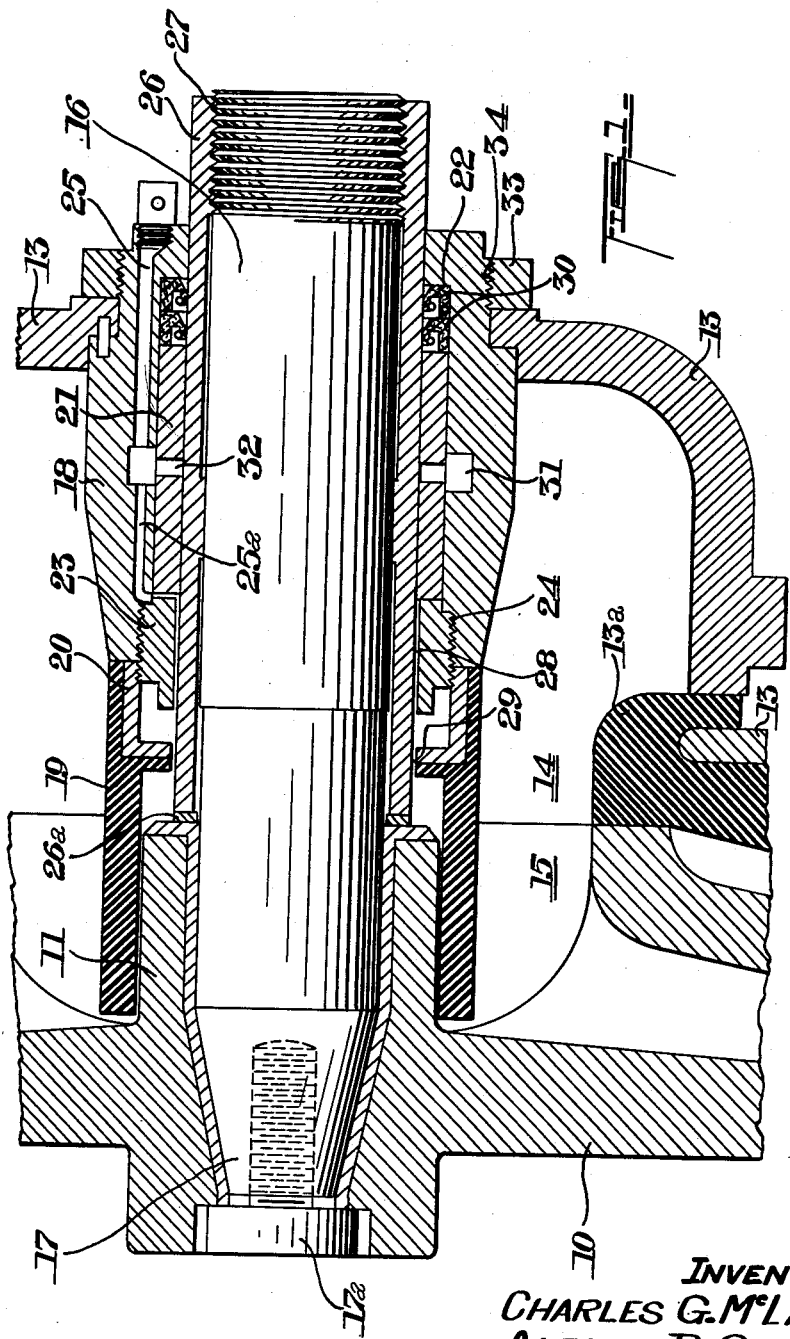

2,708,126

PUMP SEAL

Charles G. McLachlan, Horace L. Ames, and Alfred P. Gribbin, Noranda, Quebec, Canada Application August 4, 1950, Serial No. 177,678

1 Claim. (Cl. 286—9)

This invention generally relates to centrifugal pumps for the pumping of liquids containing abrasive materials such as sand. A widely used pump of this type is disclosed in United States Patent No. 2,245,866, which issued to C. G. McLachlan (one of the co-inventors of the instant application) on June 17, 1941. More particularly, the invention relates to a seal for preventing leakage (of material being pumped) along the pump shaft.

The present invention is an improvement upon the pump disclosed in U. S. Patent No. 2,245,866. The pump of that patent comprises an impeller disposed within a fixed pump casing which has an inlet opening at one side thereof, an axially adjustable rotary shaft extending through the opening and on which the impeller is mounted for rotation therewith, an inlet opening in the impeller registering with the opening in one part of the casing, a fixed gland through which the shaft may be axially moved, a fixed sleeve mounted on the gland and extending freely around the shaft and hub, compressible packing rings disposed concentrically upon the shaft between the latter and the gland, and a water supply pipe and a grease supply pipe leading through the wall of the pump casing and entering conduits in the fixed gland. The packing rings are held in position by means of a shoulder at the end of the gland adjacent to the impeller, and an externally threaded cylindrical gland nut which threadedly engages an internally threaded portion of the gland. This internally threaded portion of the gland is at the end of the gland opposite to the shouldered end, and thus the gland nut is accessible for adjustment from without when tightening of the nut upon the packing rings, or removal of the rings, appears to be desirable.

The water supply pipe and conduit are provided to enable water to be directed to the space between the sleeve and the shaft, so that any abrasive material which might enter this space would be removed. The grease pipe is provided so that the packing may be lubricated.

With this arrangement some difficulty was found in lining up both the water and grease supply pipes with the conduits in the gland. Furthermore, the portion of the pipe which was disposed within the casing was subjected to serious wear due to the abrasive action of the material being pumped.

With the prior arrangement it was necessary to bring the water and grease supply pipes through the casing wall and peripherally into the gland since the necessity of periodically tightening the packing required an accessible tightening nut at the outer end of the gland and thus prevented the introduction of these supply pipes at that point.

It has now been found that the use of an incompressible water-lubricatable packing sleeve in place of the former compressible packing rings makes possible a construction which eliminates the above-mentioned disadvantages of the prior construction. As the incompressible packing does not require tightening during its use, but requires only to be initially tightened in position, we have found it possible in effect to reverse the gland so that the shoulder is at the outer end and the gland nut at the inner end. This transfer of the gland nut to the inner end of the gland and its consequent inaccessibility during operation of the pump has not been found disadvantageous, as it would at first appear to be, since the pump, in contradistinction to previous abrasive fluid pumps, will run for long periods without requiring attention or adjustment; but the transfer of the gland nut to the inner end of the gland does make possible a substantial simplification of the water supply system, namely the attachment of a water supply pipe at the outer end of the gland and the formation of a longitudinal water supply conduit in the gland leading from the water supply pipe connection to the packing sleeve.

We have found the substantially incompressible sleeve we employ not only effectively guards against impeller shaft wear by the abrasive material, but also tends to damped any shaft vibration by acting as a third bearing for the shaft.

In the case of the pump of U. S. Patent No. 2,245,866, it was found that grease (which was necessarily present to lubricate the compressible packing rings) could be carried away by the liquid being pumped. This grease was liable to decrease the efficiency of flotation and other treatments subsequently given the liquid. This danger is entirely absent in the present case where the packing sleeve is water-lubricated.

A more complete understanding of the invention and the improvements which it represents over the pump of U. S. Patent No. 2,245,866, may be gathered from a study of the detailed description which follows, and the appended drawings.

In the drawings:

Fig. 1 is a longitudinal section through a portion of a pump constructed in accord with the invention (conventional portions of the pump have been broken away from the showing of Figure 1 since it was desired to illustrate the improved area of the pump on a generous scale).

Referring to Figure 1, reference numeral 10 indicates an impeller having a central hub 11. Impeller 10 is disposed within a fixed pump casing 13 having an inlet opening 14 in one part thereof. (Portions of casing 13 may be lined with abrasion-resistant material as indicated at 13A.) Impeller 10 has an inlet opening 15 which registers with the inlet opening 14 of the casing. An axially adjustable rotary shaft 16 extends centrally through the inlet openings 14 and 15 and has a reduced end 17 upon which hub 11 of impeller 10 is rigidly mounted by means of an impeller screw 17a.

Shaft 16 extends into the casing through a fixed gland 18, at one end of which is mounted a fixed sleeve 19. Sleeve 19 extends freely, as can be seen from the slight clearance illustrated, around the shaft 16 and hub 11. Sleeve 19 is preferably formed, as indicated, of rubber or like abrasive resisting material, with a suitable base for attachment purposes, as indicated at 20.

A packing sleeve 21 formed of substantially incompressible water-lubricatable bearing material is disposed concentrically with respect to shaft 16 between the latter and gland 18. Packing sleeve 21 is held in position by an internal shoulder 22 on gland 18, at the end thereof remote from the impeller, and by an externally threaded locking nut 23 which is concentrically disposed with respect to the shaft, and threadedly engages the gland (which is internally threaded as indicated at 24, at the end thereof adjacent the impeller 10.)

A water supply conduit 25 leads directly from the exterior of the pump substantially longitudinally through gland 18 to communicate with packing sleeve 21. Gland 18 is provided with an annular groove 31, which serves as a duct. Groove 31 encircles packing sleeve 21 at substantially the mid-point thereof, and a plurality of orifices 32 extend radially through packing sleeve 21 to communicate with groove 31 in gland 19. An extension 25a of conduit 25 leads from groove 31 to the inward end of packing sleeve 21. The gland assembly is held in place by a locking nut 33 which threadedly engages an externally threaded portion 34 of gland 18. We preferably dispose sealing rings 30 between shoulder 22 on gland 18 and packing sleeve 21.

Water directed through conduit 25 serves a dual purpose; it lubricates packing sleeve 21, and eventually passes through the space between fixed sleeve 19 and the shaft and hub, and in so doing it also tends to drive out any particles of abrasive material which have succeeded in entering this space. In performing the work of driving out such particles it may, if required, be aided by by-passing some of the water through conduit extension 25a. The flow of water through conduits 25 and 25a is very small compared to the amount being pumped. For example, we have found that a flow of somewhat less than a gallon per minute is quite sufficient when the pump is operating at a rate of 900 gallons per minute.

While it is by no means essential to the invention we prefer to provide shaft 16 with a wearing sleeve 26. Wearing sleeve 26 is concentrically mounted upon the shaft and is in threaded engagement therewith as indicated at 27. Wearing sleeve 26 runs the full length of gland 18 and extends inwardly sufficiently to meet hub 11. A packing washer 26a is disposed between hub 11 and wearing sleeve 26. It may be noted that a small clearance 28 is provided between gland nut 23 and wearing sleeve 26 and that a clearance 29 is provided between the wearing sleeve and fixed sleeve 19 (and its metallic base 20.) Clearances 28 and 29 enable the water leaving the packing sleeve 21 to enter the space between sleeve 19 and the shaft and hub, whence the water passes into the pump chamber, carrying with it abrasive material which may have entered the space.

Where no wearing sleeve is provided, the clearance between the shaft and the water lubricated packing sleeve 21 must be sufficient to permit the water to pass into the pump chamber.

Shaft 16 is supported outside the pump casings by two bearings. Packing sleeve 21, being substantially incompressible, acts as an effective bearing as well as performing its primary function as a packing. Shaft 16 is thus provided with a third bearing, which tends to dampen any shaft vibration, such as that which be set up by a partly worn, or unbalanced impeller.

In order to assure secure retention of the impeller 10 on the shaft 16, and to insure that the wearing sleeve 26, gland 18, fixed sleeve 19, and packing sleeve 21 maintain their desired relationship through long periods of pump operation, were commend certain relationships of the direction of threading of these elements to the direction of rotation of the shaft 16. Assuming that the direction of rotation of the shaft when viewed from the driven end is clockwise, then if impeller screw 17a is provided with a right-hand thread it will be self-tightening with respect to the rotation of the shaft and will hold the impeller firmly in place. With the shaft rotation assumed above, we recommend that the threading on locking nut 23 and on wearing sleeve 26 be left-handed, so that sleeve 26 will remain in tight engagement with packing washer 26a, and that nut 23 will, if it creeps during pump operation, merely move into tighter engagement with packing sleeve 21. This left hand threading of nut 23 also serves to make the metallic base 20 of fixed sleeve 19 self-tightening during rotation of the shaft 16.

What we claim is:

In combination with a pump casing, a seal for preventing leakage along the pump shaft of material being pumped, the seal comprising a fixed gland, a fixed sleeve mounted on said gland and extending freely around said shaft and terminating in the region of one end of the shaft, a non-adjustable packing sleeve formed of substantially incompressible water-lubricatable bearing material disposed concentrically upon said shaft between the latter and the gland, a water supply conduit extending substantially longitudinally through the gland to communicate with the packing sleeve, an internal shoulder on said gland at the end remote from the said end of the shaft, internal threading at the end of said gland adjacent the said first end of the shaft, an externally threaded locking nut concentrically disposed with respect to the shaft and threadedly engaged with the said internal threading on the gland to clamp the packing sleeve between the shoulder and the nut, a groove formed in said gland, said groove encircling said packing sleeve substantially at the mid-point thereof, a plurality of orifices extending radially through said packing sleeve to communicate with said groove, and a water supply conduit extension leading from said annular groove to the inward end of said packing sleeve.

References Cited in the file of this patent

UNITED STATES PATENTS

| | | |
|---|---|---|
| 1,474,454 | Telfer | Nov. 20, 1923 |
| 1,910,811 | Peterson | May 23, 1933 |
| 1,931,724 | Fageol | Oct. 24, 1933 |
| 2,037,293 | Weinman | Apr. 14, 1936 |
| 2,049,774 | Hoffman | Aug. 4, 1936 |
| 2,245,866 | McLachlan | June 17, 1941 |
| 2,251,231 | Runals | July 29, 1941 |
| 2,448,717 | Jeffcock | Sept. 7, 1948 |

FOREIGN PATENTS

| | | |
|---|---|---|
| 93,799 | Sweden | Dec. 14, 1938 |